(12) United States Patent
Coates et al.

(10) Patent No.: US 8,166,668 B2
(45) Date of Patent: May 1, 2012

(54) METHOD FOR THE PREPARATION OF FLUOROPOLYMER POWDERED MATERIALS

(75) Inventors: Michael Coates, Elverson, PA (US);
Iaian Robert Whitlow, Cheshire (GB);
Terry Anderson, Cheshire (GB)

(73) Assignee: Whitford Plastics Limited, Cheshire (GB)

( * ) Notice: Subject to any disclaimer, the term of this patent is extended or adjusted under 35 U.S.C. 154(b) by 565 days.

(21) Appl. No.: 12/160,533

(22) PCT Filed: Jan. 16, 2007
(Under 37 CFR 1.47)

(86) PCT No.: PCT/GB2007/000116
§ 371 (c)(1),
(2), (4) Date: Aug. 14, 2009

(87) PCT Pub. No.: WO2007/080426
PCT Pub. Date: Jul. 19, 2007

(65) Prior Publication Data
US 2010/0132212 A1   Jun. 3, 2010

(30) Foreign Application Priority Data
Jan. 16, 2006   (GB) .................................. 0600823.9

(51) Int. Cl.
*F26B 11/00*   (2006.01)
(52) U.S. Cl. ............ 34/297; 34/381; 524/442; 524/420; 977/773
(58) Field of Classification Search .............. 34/92, 297, 34/381, 413, 497; 524/442, 420; 977/773
See application file for complete search history.

(56) References Cited

U.S. PATENT DOCUMENTS

| | | | |
|---|---|---|---|
| 3,692,759 A | 9/1972 | Ocone | |
| 3,803,108 A | 4/1974 | Ocone | |
| 5,565,188 A * | 10/1996 | Wong et al. | 424/9.411 |
| 6,355,391 B1 | 3/2002 | Van Dusen et al. | |
| 6,634,576 B2 * | 10/2003 | Verhoff et al. | 241/21 |
| 7,638,581 B2 * | 12/2009 | Jing et al. | 525/199 |
| 8,053,549 B2 * | 11/2011 | Melville et al. | 528/481 |
| 2007/0178051 A1 * | 8/2007 | Pruitt et al. | 424/46 |
| 2007/0178232 A1 * | 8/2007 | Kodas et al. | 427/180 |
| 2008/0286329 A1 * | 11/2008 | Campbell et al. | 424/423 |
| 2009/0017209 A1 * | 1/2009 | Morgan et al. | 427/256 |
| 2009/0287300 A1 * | 11/2009 | Dave et al. | 623/1.42 |
| 2009/0301382 A1 * | 12/2009 | Patel | 116/201 |
| 2009/0304801 A1 * | 12/2009 | Liversidge et al. | 424/491 |
| 2009/0317553 A1 * | 12/2009 | Harvey et al. | 427/385.5 |
| 2010/0086246 A1 * | 4/2010 | Melville et al. | 384/276 |
| 2010/0112195 A1 * | 5/2010 | Kodas et al. | 427/98.4 |
| 2010/0132212 A1 * | 6/2010 | Coates et al. | 34/287 |
| 2010/0204440 A1 * | 8/2010 | Melville et al. | 528/481 |
| 2011/0104607 A1 * | 5/2011 | Wang et al. | 430/108.23 |
| 2011/0224350 A1 * | 9/2011 | Coates et al. | 524/443 |

FOREIGN PATENT DOCUMENTS

| | | |
|---|---|---|
| DE | 101 26 649 | 12/2002 |
| GB | 2434152 A * | 7/2007 |
| GB | 2451096 A * | 1/2009 |
| GB | 2451097 A * | 1/2009 |
| JP | 08 185865 | 7/1996 |
| WO | WO 2009052163 A2 * | 4/2009 |
| WO | WO 2009146277 A1 * | 12/2009 |

OTHER PUBLICATIONS

Applicant's response to the Examination Report dated Jun. 11, 2010 filed on Oct. 15, 2010 in European Application No. 08775953.6.
European Examination report issued May 31, 2011 in European Application No. 08775953.6.
The British Office Action mailed Apr. 6, 2010 in related British Patent Application No. GB0600823.9.
The British Office Action mailed Aug. 24, 2010 in related British Patent Application No. GB0600823.9.

* cited by examiner

*Primary Examiner* — Stephen M. Gravini
(74) *Attorney, Agent, or Firm* — Faegre Baker Daniels

(57) ABSTRACT

A method for the preparation of fluoropolymer powdered materials is disclosed. A suspension of solid fluoropolymer particles in a liquid carrier, preferably water, is frozen and the frozen carrier is then removed by sublimation at sub-atmospheric pressure to produce a dry powder of fluoropolymers particles.

19 Claims, No Drawings

METHOD FOR THE PREPARATION OF FLUOROPOLYMER POWDERED MATERIALS

RELATED APPLICATIONS

The present application is a national stage entry of PCT Application No. PCT/GB2007/000116, filed Jan. 16, 2007, which claims priority from U.K. Application Number GB06008239, filed Jan. 16, 2006, the disclosures of which are hereby incorporated by reference herein in their entirety.

FIELD OF THE INVENTION

The present invention relates to a method for the preparation of Fluoropolymer powdered materials.

BACKGROUND OF THE INVENTION

Fluoropolymers are long-chain polymers comprising mainly ethylenic linear repeating units in which some or all of the hydrogen atoms are replaced with fluorine. Examples include poly(tetrafluoroethylene) (PTFE), perfluoromethyl vinyl ether (MFA), fluoro ethylene propylene (FEP), perfluoro alkoxy (PFA), poly(chlorotrifluoroethylene) (PCTFE) and poly(vinylfluoride) (PVF). They are amongst the most chemically inert of all polymers and are characterized by an unusual resistance to acids, bases and solvents. They have unusually low frictional properties and have the ability to withstand extremes of temperature. Accordingly, fluoropolymers are utilized in a wide variety of applications in which resistance to extreme environments is necessary. Current applications include the formation of tubing and packing materials within chemical plants, semiconductor equipment, automotive parts and structural cladding.

There are several application methods, one of which requires the powdered form of the fluoropolymer. Here the fluoropolymer is typically applied to a surface by electrostatic spraying of the powder. Uses include the coating of household cookware to increase non-stick properties and abrasion resistance, and the coating of automotive parts to increase resistance to environmental weathering.

At present, two methods are used to produce the powdered form of a fluoropolymer. Spray drying methods comprise the pumping of an aqueous dispersion of the fluoropolymer feed into an atomizing system, generally located at the top of a drying chamber. The liquid is atomized into a stream of heated gas to evaporate the water and produce a dry powder. This method has several limitations. The requirement that the aqueous dispersion is pumped into the atomizing system limits the use of this process to pumpable materials, and the spray dried agglomerates are tightly bound to each other and resist subsequent disagglomeration. In addition, only non-fibrillatable materials can be processed, as atomization may result in the fibrillation of the fluoropolymer, resulting in an intractable 'marshmallow' material which is difficult to handle.

An alternative method involves the coagulation of the particles within an aqueous dispersion. Coagulation is facilitated by the use of high mechanical shear, the addition of acids or the addition of gelling agents and subsequent treatment with a water immiscible organic liquid. The coagulated particles can be separated from the residual liquid by filtration and subsequently dried, typically using tray, belt or flash dryers. The coagulated granules are usually case hardened for ease of handling. However, the formation of agglomerates results in a particle size that is too large for use in conventional powder spray application techniques. Milling, traditionally used to adjust the particle size distribution, can cause fibrillation of the particles, to produce an intractable material which is difficult to handle. The case hardened material also produces a tight agglomerate which resists subsequent disagglomeration.

SUMMARY OF THE INVENTION

Embodiments of the present invention enable a method for the preparation of fluoropolymer powdered materials in which the fluoropolymer particles do not tightly agglomerate, and in which the powdered material may be produced from a liquid suspension of the solid fluoropolymer particles, which under normal circumstances would not be pumpable because of its fibrillatable nature.

DETAILED DESCRIPTION

According to embodiments of the present invention, a method for the preparation of fluoropolymer powdered materials comprises freezing a suspension of the solid fluoropolymer particles in a liquid carrier and subsequently separating out the fluoropolymer particles by means of sublimation of the frozen carrier to produce a dry powder.

The method can be particularly suitable for the processing of the following polymers poly(tetrafluoroethylene) (PTFE), perfluoromethyl vinyl ether (MFA), fluoro ethylene propylene (FEP), perfluoro alkoxy (PFA).

The fluoropolymer powdered materials can have a particle size that is sufficiently small to allow application by conventional powder spray application techniques. The agglomerates, having a primary particle size of about 0.2 μm, produced can have an average diameter of from about 1 to about 100 μm, and more particularly from about 20 to about 30 μm.

The suspension of the solid fluoropolymer particles in a liquid carrier is frozen in a freezer at a temperature below about 0° C. More particularly, the suspension is frozen at a temperature in the range of from about −60° C. to about −20° C. Typically, freezing can be completed in about 6 hours to about 24 hours.

The suspension of the solid fluoropolymer particles in a liquid carrier can be poured, scooped or otherwise transferred into a tray prior to freezing. The tray containing the suspension of the solid fluoropolymer particles is then placed into the freezer and frozen within the tray.

The liquid carrier can be water-based with or without surfactant(s) and with or without bridging solvents, i.e., organic solvents used to aid the dispersion/solvating of additional resins. If bridging solvents are used, they should be at concentrations low enough and have high enough melting points so that freezing is not inhibited.

The sublimation can be carried out using sub-atmospheric pressure or a vacuum. The use of a reduced pressure causes sublimation of the carrier from a frozen state directly to a gaseous state, avoiding the solid to liquid and liquid to gas transition. The reduced pressure can be created by means of a vacuum pump. The reduced pressure can be in the range of from about 0.01 atmospheres (atm) to about 0.99 atm, and more particularly from about 0.04 atm to about 0.08 atm. Typically, sublimation can be completed in about 12 hours to about 48 hours.

For some fluoropolymers, the method is carried out at a temperature which is in practice below the glass transition temperature of the fluoropolymer. The glass transition temperature, $T_g$, of a polymer is the temperature at which it changes from a glassy form to a rubbery form. The measured value of $T_g$ will depend on the molecular weight of the polymer, its thermal history and age, and on the rate of heating and cooling. Typical $T_g$ values are about 130° C. for PTFE, about 75° C. for PFA, about −208° C. for FEP, and about −45° C. for PVDF.

The temperature is controlled to assist the sublimation process and avoid melting of the carrier liquid. These controls also maintain temperatures below the Tg values for some of the materials listed. Thus, the method can be carried out at ambient temperature. Alternatively, the method can be carried out at a temperature above ambient temperature, in order to reduce the time taken to complete the process.

The fluoropolymer particles can be modified prior to freezing, after sublimation has occurred, or at any point during the process of the present invention. Such modifications can include the addition of fillers, and/or milling or irradiation of the fluoropolymer. The addition of fillers can be carried out before drying to improve blend stability; milling can be carried out after drying.

Irradiation of the fluoropolymer can be carried out after milling to assist in particle size control.

The addition of fillers at the liquid stage allows the filler particles to disperse efficiently between the fluoropolymers particles thus imparting desirable properties to the finished powder coating. Post milling or irradiation of the freeze-dried fluoropolymers materials can also enhance their suitability as powder coating materials.

Fillers comprise those substances which enhance or modify the specific physical characteristics of the fluoropolymer. For example, fillers can alter the color, adhesion characteristics, hardness and/or corrosion resistance of the fluoropolymer. Examples of fillers include temperature stable pigments, binders, glass beads, bronze powder, and tungsten. Other specific fillers include silicon carbide, polyphenylene sulphide (PPS), zinc phosphate, poly amide imide (PAT), polyether imide (PEI), polyetheretherketone (PEEK), and other engineering polymers and combinations thereof.

The method can additionally comprise the milling of the fluoropolymer particles. Milling adjusts the particle size distribution of the fluoropolymer, for example reducing the mean particle size to produce a finer powder. Typically the milling would be carried out conventionally in a pin or jet mill.

The method may additionally comprise irradiation of the fluoropolymer particles, typically as a powder but alternatively in the suspension. Irradiation adjusts the melt characteristics of the fluoropolymer, for example to lower the melting temperatures/glass transition temperatures and increase the melt flow rate.

The method of the present invention does not result in the tight agglomeration of the particles, but instead produces a fine powder, which is suitable for use in conventional powder spray application techniques or for redispersion in aqueous or organic media. The friable powder can be broken down easily for particle size modification.

The method of the invention can be carried out at a temperature below the glass transition temperature of the fluoropolymer, in contrast to the known processes involving spray drying and coagulation, which require temperatures well in excess of about 100° C. The use of ambient temperature allows greater energy efficiency, while the use of temperatures that are above ambient temperature, but below the glass transition temperature, can be used to increase the speed with which the sublimation proceeds. Temperatures above ambient can also be used to assist secondary drying, to drive off any remaining liquid carrier traces.

The method of the invention can be used to prepare fluoropolymer powdered materials from fluoropolymers that are either fibrillatable or non-fibrillatable. Fibrillatable materials are those which form fibers when exposed to a shear farce. The known methods, which involve spray drying and coagulation, both expose the solid fluoropolymer particles to shear forces, which can result in the production of an intractable material. The present invention does not involve shear forces at any stage and is therefore suitable for use with fibrillatable fluoropolymers.

The method of the invention can be used to prepare a fluoropolymer powdered material from a pumpable or non-pumpable suspension of the solid fluoropolymer particles in a liquid carrier. The suspension can be non-pumpable because of high viscosity or shear sensitivity and examples include high molecular weight PTFE or unstabilized PFA, MFA and FEP dispersions. The method does not involve any steps where the suspension must be pumped. Instead, the suspension can be poured or scooped into the tray for freezing, and the solid, frozen block can then be transferred into the vacuum chamber.

The invention can be carried into practice in varying ways and some embodiments will now be described by way of the following example(s). Variations within the scope of the disclosure will be apparent to those skilled in the art.

General Description of Preparation

In a typical process, a fluoropolymer (modified or unmodified) with a particle size of about 0.2 μm is formed into a dispersion in water by mixing, optionally with a surfactant and/or bridging solvent, depending on the nature of the polymer. The dispersion is poured into trays, typically to a depth of about 1 to about 1.5 cm. The loaded trays are then frozen to a temperature between about −60 and about −20° C. When frozen the trays are loaded into a vacuum chamber and the pressure reduced to between about 0.01 and about 0.99 atmospheres, and more particularly between about 0.04 and about 0.08 atm. Under these conditions sublimation of the liquid carrier takes place. Additional heating can be applied to assist the sublimation process while avoiding melting the frozen carrier material, and to assist secondary drying.

Subsequent process steps can include milling, irradiating and/or compaction to modify powder properties and tailor to specific requirements.

Specific dispersions made and treated as described are set out below.

Fluoropolymers

PFA dispersion in water with a solids content of about 23-27 wt. % and a melt flow rate of about 7.2 g/10 min measured at 372° C.

FEP dispersion in water with a solids content of about 23-27 wt. % and a melt flow rate of about 6.5 g/10 min measured at 372° C.

MFA dispersion in water with a solids content of about 28-32 wt. % and a melt flow rate of about 5.4 g/10 min measured at 372° C.

PTFE dispersion in water with a solids content of about 30-60 wt. % and a melt flow rate of about 1-10 g/mins measured at 372° C.

Other Components

One or more other components that can be included in the dispersions mentioned. These other components can include, for example, one or more of the following:

Silicon Carbide, average particle size of about 3 microns, available from CARBOREX;

Polyphenylene sulphide (PPS) available from RYTON;

Red 120 Iron oxide pigment available from BAYFEROX;

PK 6075 Ochre pigment available from FERRO; and/or

34E23 Black mineral pigment available from JOHNSON.

The invention claimed is:

1. A method for preparing a modified fluoropolymer powdered material, said method comprising the following steps:
   providing a suspension of solid fluoropolymer particles and at least one filler in a water-based liquid carrier;
   freezing the suspension; and
   sublimating the frozen carrier by phase transition from a solid state directly to a gaseous state, thereby forming the modified fluoropolymer powdered material as a dry powder.

2. The method according to claim 1, wherein said sublimating the frozen carrier step is accomplished at a sub-atmospheric pressure.

3. The method according to claim 2, wherein the sub-atmospheric pressure is in a range of from about 0.01 atmospheres to about 0.99 atmospheres.

4. The method according to claim 1, wherein said sublimating the frozen carrier step is carried out at a temperature below a glass transition temperature of the fluoropolymer.

5. The method according to claim 1, wherein said sublimating the frozen carrier step is carried out at ambient temperature.

6. The method according to claim 1, wherein said sublimating the frozen carrier step is carried out at a temperature between ambient temperature and a glass transition temperature of the fluoropolymer.

7. The method according to claim 1, wherein said freezing step is carried out at a temperature in a range of from about −60° C. to about −20° C.

8. The method according to claim 1, wherein the suspension of the solid fluoropolymer particles and filler in the water-based liquid carrier is frozen in one or more trays.

9. The method according to claim 1, wherein the filler is selected from pigments, binders, and combinations thereof.

10. The method according to claim 1, further comprising the additional step of:
    milling the fluoropolymer particles.

11. The method according to claim 1, further comprising the additional step of:
    irradiating the fluoropolymer particles.

12. The method according to claim 1, wherein the fluoropolymer is fibrillatable.

13. The method according to claim 1, wherein the fluoropolymer is non-pumpable.

14. The method according to claim 1, wherein the fluoropolymer is polytetrafluoroethylene (PTFE).

15. The method according to claim 1, wherein the fluoropolymer is fluorinated ethylene propylene (FEP).

16. The method according to claim 1, wherein the fluoropolymer is perfluoroalkoxy (PFA).

17. The method according to claim 1, wherein the fluoropolymer comprises perfluoro methyl vinyl ether.

18. The method according to claim 1, wherein the dry fluoropolymer material comprises particles having an average particle diameter from 1 μm to 100 μm.

19. The method according to claim 1, wherein the dry fluoropolymer material comprises particles having an average particle diameter from 20 μm to 30 μm.

* * * * *